United States Patent [19]
Nanaji et al.

[11] Patent Number: 5,464,466
[45] Date of Patent: Nov. 7, 1995

[54] FUEL STORAGE TANK VENT FILTER SYSTEM

[75] Inventors: Seifollah S. Nanaji, Greensboro; Kenneth L. Pope, Walkertown; Richard R. Sobota, Kernersville, all of N.C.

[73] Assignee: Gilbarco, Inc., Greensboro, N.C.

[21] Appl. No.: 153,528

[22] Filed: Nov. 16, 1993

[51] Int. Cl.$^6$ ..................................................... B01D 61/00
[52] U.S. Cl. ................................. 95/45; 95/19; 95/50; 96/4
[58] Field of Search ........................... 95/19, 45, 46, 95/47, 54, 50; 96/4, 6

[56] References Cited

U.S. PATENT DOCUMENTS

| | | | |
|---|---|---|---|
| 3,751,879 | 8/1973 | Allington | 96/6 |
| 3,861,890 | 1/1975 | Doncer et al. | |
| 3,907,524 | 9/1975 | Haines et al. | |
| 4,058,373 | 11/1977 | Kurz et al. | 96/6 |
| 4,101,297 | 7/1978 | Uda et al. | |
| 4,118,170 | 10/1978 | Hirt | 431/5 |
| 4,670,028 | 6/1987 | Kennedy | |
| 4,673,418 | 6/1987 | Peinemann | |
| 4,788,556 | 11/1988 | Hoisington et al. | 995/46 |
| 4,994,094 | 2/1991 | Behling et al. | |

(List continued on next page.)

FOREIGN PATENT DOCUMENTS

| | | |
|---|---|---|
| 0247585 | 12/1987 | European Pat. Off. |
| 0443068A1 | 8/1991 | European Pat. Off. |
| 8702074.2 | 4/1987 | Germany |

(List continued on next page.)

OTHER PUBLICATIONS

Magazine: "Das Magazin for Wirtschaft, Forschung, Technik, Umwelt" Article Entitled: "Kohlenwasserstoffe aus Gasstromen abtrennen" by Von K. Ohlrogge, dated Jun. 1993.
A Reprint from "Separation Science and Technology" Article entitled: "Engineering Aspects of the Plant Design to Separate Volatile Hydrocarbons By Vapor Permeation" by K. Ohlrogge, J. Brockmoller, J. Wind, D. Behling, dated 1992.
Paper entitled "Small Scale Applications to Separate Organic Vapors by Means of Membranes" by K. Ohlrogge and J. Wind undated.
Paper entitled "Gossler—Regas Systems" Author unnamed–Undated.
paper Presented at "The 1993 Eleventh Annual Membrane Technology/Separations Planning Conference" Oct. 11, 12, 13, 1993 Newton, Massachusetts entitled Volatile Organic Compound Control Technology By Means of Membranes by K. Ohlrogge.
Paper Presented at "The 1991 Annual Membrane Technology/Planning Conference"0 Nov. 4–6, 1991 Newton, Mass. entitled Operating Experience with membrane Systems in Gasoline Tank Farms by K. Ohlrogge.

*Primary Examiner*—C. Scott Bushey
*Attorney, Agent, or Firm*—Rhodes, Coats & Bennett

[57] ABSTRACT

An apparatus and method for maintaining a desired pressure within a fuel storage tank or tanks while minimizing or eliminating the amount of pollutants discharged from the fuel storage tank(s). A fuel storage tank is provided with a conduit and a chamber interfaced along the path of the conduit such that all fluid passing through the conduit must pass through the chamber. A fractionating membrane is housed within the chamber for capturing pollutants while allowing air to pass through. As pollutants are collected on the fractionating membrane, they permeate, thereby reducing the pressure in the tank and associated conduit. A vapor pump is provided for drawing vapor through the conduit and the membrane, and for drawing pollutants off of the membrane. A pressure transducer located in the tank or associated piping makes the vapor pump responsive to the pressure therein. A vent is further provided for allowing air into the tank and piping and for depressurizing the tank and piping. The apparatus of the present invention may be provided with a conduit for returning the pollutants to the fuel storage tank(s).

8 Claims, 2 Drawing Sheets

U.S. PATENT DOCUMENTS

| | | | |
|---|---|---|---|
| 5,040,577 | 8/1991 | Pope | 141/59 |
| 5,209,262 | 5/1993 | Carow et al. . | |
| 5,222,532 | 6/1993 | Janssen et al. . | |
| 5,254,251 | 10/1993 | Bengston et al. . | |

FOREIGN PATENT DOCUMENTS

| | | | |
|---|---|---|---|
| 3708950 | 9/1988 | Germany | 96/6 |
| 3806107A1 | 8/1989 | Germany . | |
| 3824400A1 | 1/1990 | Germany . | |
| 4142411C1 | 5/1993 | Germany . | |
| 9205552.4 | 8/1993 | Germany . | |
| 4214424 | 10/1993 | Germany . | |
| 4214551 | 10/1993 | Germany . | |
| 4225170A1 | 2/1994 | Germany . | |
| 52-138479 | 11/1977 | Japan . | |
| 1-270909 | 10/1989 | Japan | 96/6 |
| 668875 | 6/1979 | U.S.S.R. | 96/6 |
| 1341052 | 12/1973 | United Kingdom . | |
| WO91/01177 | 2/1991 | WIPO . | |
| WO91/06363 | 5/1991 | WIPO . | |
| WO93/22031 | 11/1993 | WIPO . | |

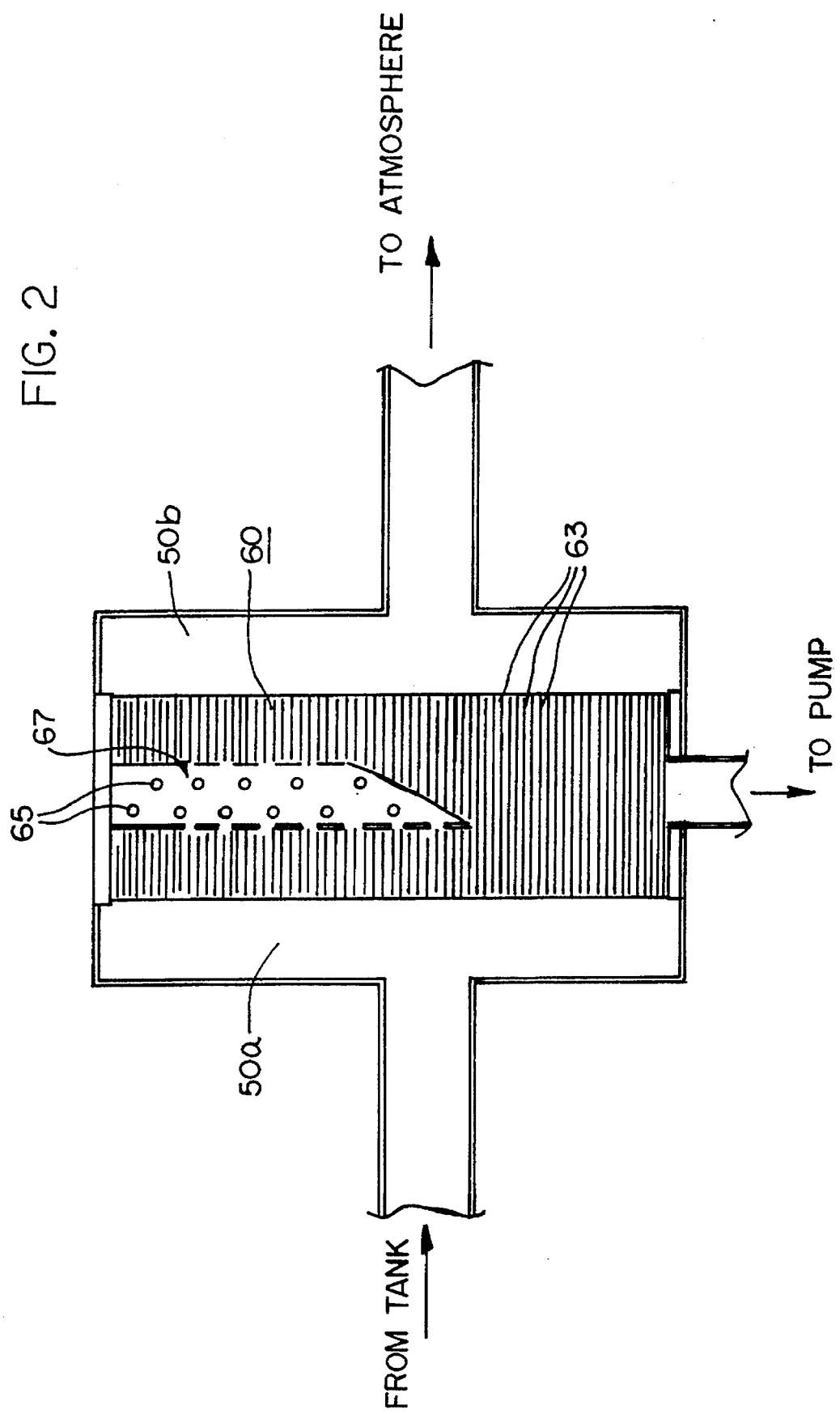

FUEL STORAGE TANK VENT FILTER SYSTEM

Field of the Invention

The present invention relates to apparatus for reducing the discharge of pollutants from fuel storage tanks, and, in particular, to a fuel storage tank pressure control system having a fractionating filter for removing pollutants from vapor discharged from a fuel storage tank.

BACKGROUND OF THE INVENTION

When fuel is added to a fuel reservoir, such as the gasoline tank of an automobile from a conventional gas dispenser apparatus such as the dispensing nozzle of a gasoline dispenser, gasoline vapor is displaced from the gasoline tank. If the vapor is not collected in some way, it will be released into the atmosphere. Due to the large number of automobile refuelings, such releases of fuel vapor constitute a significant hazard to the environment, particularly in heavily populated areas. Releases of these vaporst which are composed of volatile organic compounds (VOC's) such as hydrocarbons, are presently the subject of significant and increasing federal and local regulation.

In an effort to guard against the release of volatile organic compounds to the environment, several systems have been designed to collect the vapors displaced from automobile gasoline tanks during refueling. One such system called the "balance" system provides a rubber boot which surrounds the dispenser nozzle and forms a seal &round an automobile gasoline tank filler pipe. This system relies on the volumetric displacement of the vapor by the fluid transferred through the nozzle to the gasoline tank to force the vapor through the boot, through a connecting conduit, and back into a fuel storage tank. A bulky and cumbersome nozzle is required to effect the necessary seal at the filler pipe. If a perfect seal is not made, then vapor can leak to the atmosphere instead of being returned to the storage tank.

To mitigate the need for a cumbersome dispenser nozzle design and to increase the collection efficiency of the dispenser, systems have been designed wherein vapor collection at the nozzle is assisted by a vacuum pump. An example of such a system is disclosed in U.S. Pat. No. 5,040,577 to Pope, the disclosure of which is hereby incorporated by reference. A problem that can arise with a pump assisted system is that the pump can have a tendency to pressurize the fuel storage tank and associated piping. If the volume of vapor collected at the nozzle and conveyed into the fuel storage tank by the vapor pump is more than the volume of liquid fuel dispensed from the nozzle, the pressure in the fuel storage tank will be increased. In the current art of vapor pump assisted vapor recovery systems that use bootless nozzles, a ratio of vapor recovered versus product delivered greater than 1:1 is required to achieve desired recovery efficiency at the filler pipe.

Both pressurization and depressurization of the fuel storage tank can have detrimental effects. When a fuel storage tank has an internal pressure which is greater than the ambient pressure, there is an increased tendency for fuel and/or vapor to leak from gaps in the piping or the tank. Because many tanks are located underground, it is difficult both to detect leaks and to repair leaks. If the fuel storage tank becomes highly over-pressurized, there is a danger that the structural integrity of the tank may be threatened and even a danger of catastrophic breach of fuel containment. Additionally, over-pressurization of the fuel storage tank lessens the efficiency of the vacuum assist pump by creating a greater pressure differential between the nozzle and the fuel storage tank.

In order to solve the foregoing problems of over-pressurization, several devices and methods have been developed to vent fuel storage tanks. It will be understood that a large portion of gas vented from the fuel storage tank will consist of volatile organic compounds. Regulations exist and will likely be made more stringent which limit the amount of VOC's that may be expelled into the atmosphere by such vents. Several techniques have been developed to meet these regulations. One such technique is disclosed in U.S. Pat. No. 4,118,170 to Hirt. The invention of Hirt involves burning the vapor vented. The danger of this technique is obvious, and the technique is presently not allowed in many areas. An alternate technique is to cool the vapor and return the condensed vapor to the tank as liquid. This technique is relatively expensive as it requires a refrigeration device.

Therefore, there exists a need for an efficient, cost-effective apparatus and method for removing volatile organic compounds and other pollutants from gas vented from a fuel storage tank. Furthermore, there exists a need for such a method and apparatus which can be retrofitted to existing fuel storage tanks.

SUMMARY OF THE INVENTION

The present invention is directed to an apparatus and method for maintaining a desired pressure within a fuel storage tank or tanks while minimizing or eliminating the amount or mass of pollutants discharged from the fuel storage tank or tanks. A fuel storage tank is provided with a conduit on an upper portion thereof. The conduit terminates with a vent to the atmosphere. A chamber is interfaced along the path of the conduit such that all vapor passing through the conduit must pass through the chamber. A filter or fractionating membrane is housed within the chamber. Vapor comprising air and pollutants, such as volatile organic compounds, traveling through the chamber is separated into each of its two components by the fractionating membrane. Specifically, the air is allowed to pass through the chamber, and the pollutants are captured by the fractionating membrane. A vacuum pump is provided for drawing pollutants through the membrane and from the membrane. A pressure transducer located in the tank or associated piping makes the vapor pump responsive to the pressure therein. When the tank and piping reach a set pressure level, the transducer actuates the pump, thereby drawing pollutants through the membrane. The vapor is removed from the membrane by the pump. A vent is further provided for allowing air and/or vapor out of the tank and piping to depressurize the tank and piping if the pump and membrane are insufficient. The vent can also allow air into the tank to compensate for any underpressure. The apparatus of the present invention may be provided with a conduit for returning the pollutants to one or more of the fuel storage tanks.

BRIEF DESCRIPTION OF THE DRAWINGS

The invention will be better understood after a reading of the following description of the preferred embodiment when considered with the drawings.

FIG. 2 is a fragmentary, cross-sectional view of the chamber and the membrane forming a part of the present invention.

DESCRIPTION OF THE PREFERRED EMBODIMENT

Figure 1:
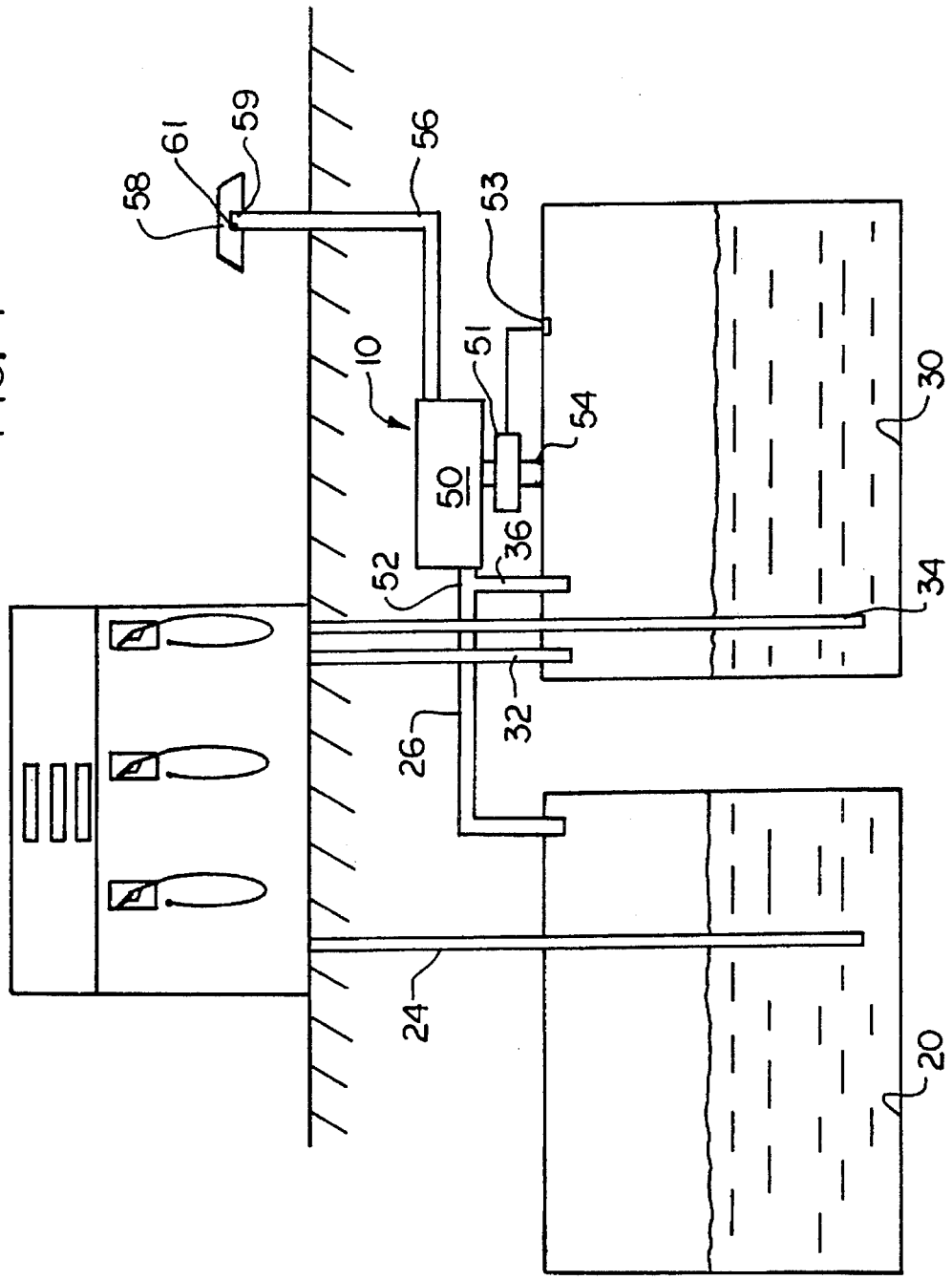
FIG. 1 is a schematic view of the vent filter system of the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto.

As best seen in FIG. 1, the fuel storage tank vent system of the present invention, generally denoted by the numeral 10, is shown therein in conjunction with two conventional underground fuel storage tanks 20,30. It will be understood that vent system 10 may be used with above-ground storage tanks, as well. Furthermore, vent system 10 may be used with any number of storage tanks. Tank 20 contains high octane fuel and tank 30 contains low-grade fuel. The preferred embodiment shows the vent system of the present invention as it may be used with a fuel dispenser system having a vapor recovery vacuum assist system but it will be understood that the invention could be used on other vapor recovery systems, such as the balance system.

Fuel tanks 20,30 have vapor return line 32 for receiving vapor recovered by a conventional fuel dispenser system having means for collecting fuel vapors (not shown). Fuel tanks 20,30 further include fuel delivery lines 24,34 for outputting fuel to the fuel dispenser. Vent lines 26,36 are provided at the top of tanks 20,30 and extend to manifold 52. The manifolded vent lines 26,36 equalize the pressure between tanks 20,30, permitting the return of all vapors to one tank 30 via return line 32. Additional return lines to additional tanks can be provided but are generally not needed.

Manifold 52 extends to chamber 50. Chamber 50 has outlet line 56 equipped with vent 59, which is covered by rain shield 58 and has open and closable pressure/vacuum vent control valve 61. Line 54 connects the lower portion of chamber 50 and tank 30.

Membrane 60 is positioned within chamber 50 such that it separates chamber 50 into two distinct plenums 50a,50b. Membrane 60 is preferably a fractionating membrane developed by GKSS-Forschangszentram Gesthacht GmbH of Germany and described in "Operating Experiences with Membrane Systems in Gasoline Tank Farms," presented by K. Ohlrugge at the 1991 9th Annual Membrane Technology/Planning Conference in Newton, Mass., Oct. 4–6, 1991 or "Volatile Organic Compound Control Technology by Means of Membranes," presented by K. Ohlrugge at the 1993 11th Annual Membrane Technology/Separation Planning Conference in Newton, Mass. Oct. 11–13, 1993, the disclosures of which are hereby incorporated by reference. A property of membrane 60 is that it will capture or collect selected pollutants including hydrocarbons such as gasoline vapor while allowing air to pass through. As shown, membrane 60 is configured as a cylinder comprising a plurality of stacked and bound thin sheets 63. Each sheet 63 has a hole formed its center such that the cylinder has an aperture disposed therein extending axially from end to end. Disposed within the aperture is removal pipe 67 which has perforations 65 formed therein.

In operation, vent system 10 functions as follows. As fuel is dispensed via a fuel dispenser system (not shown), a given volume of liquid fuel, $V_L$, is drained from either tank 20 or tank 30 through either delivery line 24 or delivery line 34, respectively. Concurrently with the draining of liquid fuel, a given volume of fuel vapor, $V_V$, is forced into tank 30 through vapor return line 32 by the vapor pump (not shown). Typically, the ratio of $V_V$ to $V_L$ will be greater than 1:1. It will be understood that, as a result of this ratio, the pressure within the tanks will have a tendency to become greater than the ambient atmospheric pressure. It is also possible that the ratio of $V_V$ to $V_L$ will be less than 1:1. This would result in tank pressures less than atmospheric.

The pressure in plenum 50b is a design choice. Normally, valve 61 will remain closed. When the pressure in tanks 20,30, and thus manifold 52 and vent lines 26,36, reaches a given pressure, pressure transducer 53 causes pump 51 to operate. The actuation of pump 51 creates a vapor flow from tank 30, through vent line 36, through chamber 50, and through line 54 to tank 30. As the vapor flows through chamber 50, it encounters membrane 60. As the fuel vapor encounters membrane 60, the selected pollutants in the vapor are captured by the same. The vacuum created by pump 51 draws the pollutants away from the sheets 63 of membrane 60 and into removal pipe 67 through the perforations 65 formed in the same. The pollutants which flow into pipe 67 finally flow through line 54 and are deposited in low grade tank 30.

When the pressure in the tanks has returned to the desired pressure, pump 51 is de-actuated, stopping the flow of vapor.

If the system pressure becomes higher than can be sufficiently reduced by permeating the vapor through membrane 60, valve 61 opens to allow the vapor to vent to atmosphere. Because the substantial majority of the pollutants in the vapor are captured by membrane 60, opening of the valve 61 to release pollutants to the environment should be rare. Because of the physical properties of membrane 60, it is still preferable to actuate pump 51 to draw the vapor into pipe 67.

If the tank pressure becomes less than atmospheric, the opening of valve 61 will return the tank pressure to atmospheric by allowing air to enter.

Certain modifications and improvements will occur to those skilled-in the art upon a reading of the foregoing description. It should be understood that all such modifications and improvements are properly within the scope of the following claims:

We claim:

1. A method of reducing vaporous fuel emissions from a liquid fuel storage tank having an upper portion in which fuel vapors are stored comprising:

connecting the upper portion of the tank to a space bounded on at least one side with a membrane having the property of permitting fuel vapor to permeate therethrough, providing an exit from the space to atmosphere, holding liquid fuel in the tank and a mixture of vaporous fuel and air in the upper portion of the tank above the liquid, and permitting gaseous phase components in the tank to pass to the space so air passes across the membrane to atmosphere and fuel vapor permeates through the membrane within the space to reduce the volume of gasoline and air held in the space and tank and thereby reduce the pressure in the tank.

2. A method as claimed in claim 1 further comprising returning permeated fuel vapor to the tank.

3. An apparatus for reducing vaporous fuel emissions comprising a fuel storage tank having an upper portion in which fuel vapors and air are stored;

a conduit leading from the upper portion of the tank;

a chamber having
 an inlet for receiving vapors and air from the conduit,
 a first outlet for the release of air,
 a filter element including a membrane having the property of permitting vaporous pollutants to permeate therethrough, and
 a second outlet partitioned from the inlet by the membrane for receiving fuel permeated through the membrane.

4. An apparatus as claimed in claim 3 wherein said first outlet is provided with a pressure/vacuum relief valve to atmosphere.

5. An apparatus as claimed in claim 3 further comprising a vacuum pump between said membrane and said tank to provide a reduced pressure path through the membrane to induce the vaporous pollutants to encounter said membrane so as to permeate therethrough.

6. An apparatus as claimed in claim 5 further comprising a pressure sensor for said tank and a connection between said pressure sensor and said vacuum pump, whereby said vacuum pump is turned on when the pressure in said tank reaches a threshold.

7. An apparatus as claimed in claim 3 wherein a plurality of tanks are connected to a single chamber through respective conduits.

8. An apparatus for reducing vaporous pollutant emissions from a plurality of liquid gasoline storage tanks having upper portions in which gasoline vapors are stored comprising:

a chamber, conduits leading from upper portions of the tanks to said chamber, said chamber having an inlet connected to said conduits, a first outlet with a pressure/vacuum relief valve towards atmosphere, a membrane across said chamber and a second outlet, said membrane having the property of permitting gasoline vapors to permeate therethrough, a vacuum pump for said second outlet between said membrane and one of said tanks to provide a reduced pressure path through the membrane to induce the gasoline vapors to encounter said membrane so as to permeate, a pressure sensor for one of said tanks and a connection between said pressure sensor and said vacuum pump, whereby said vacuum pump is turned on when the pressure in said tank reaches a threshold, whereby gaseous phase air and gasoline components in the tank may pass through said conduit to said chamber with air passing across said membrane to said first outlet and gasoline vapors being permeated through said membrane within said chamber and exiting through said second outlet.

* * * * *

UNITED STATES PATENT AND TRADEMARK OFFICE
CERTIFICATE OF CORRECTION

PATENT NO. : 5,464,466
DATED : November 7, 1995
INVENTOR(S) : Seifollah S. Nanaji et al.

It is certified that error appears in the above-indentified patent and that said Letters Patent is hereby corrected as shown below:

Col. 4  In Claim 1, line 47 insert --and air-- after vapors.

Col. 6  In Claim 8, line 1 insert --and air-- after vapors.
    Column 6, line 23:
    In Claim 8, second line of last paragraph, tank should be  tanks  and conduit should be conduits.

Signed and Sealed this

Twenty-third Day of January, 1996

Attest:

BRUCE LEHMAN

Attesting Officer     Commissioner of Patents and Trademarks